Jan. 28, 1930.    B. GRIFFITHS    1,745,255
MEMORANDUM DEVICE
Filed July 30, 1928

Inventor:
Benjamin Griffiths.
by: Charles T. Wiley
Attys

Patented Jan. 28, 1930

1,745,255

UNITED STATES PATENT OFFICE

BENJAMIN GRIFFITHS, OF EVANSTON, ILLINOIS, ASSIGNOR OF ONE-HALF TO CLAUDE E. RICHARDS, OF EVANSTON, ILLINOIS

MEMORANDUM DEVICE

Application filed July 30, 1928. Serial No. 296,401.

This invention relates to an indicator for use with the instrument board of a motor vehicle whereby the time for oil changes or the like may be readily indicated.

The invention is applicable to any kind of a motor vehicle such as automobiles, airplanes, motor boats, trucks, and the like.

Economical and efficient operation of motor vehicles demands that the oil in the engines be changed at stated intervals, which changes may be measured by distance travel or by time.

Some automobile service stations have adopted stickers which are applied to the instrument boards near the distance indicating device, such as an odometer, which sticker bears upon itself notation of the mileage at which the oil in the engine should be changed. These stickers are unsightly and when applied to automobile detract from the appearance of the instrument board.

I have overcome the above recited objections by providing an indicator consisting of a metallic plate which may be permanently affixed to the instrument board of a motor vehicle in any convenient place. A roll of strip paper is carried by the metallic member which roll is covered for the portion of the roll exposed for prehension and also for receiving data as to the next oiling interval. The indicator may be finished to correspond with the finish of the instrument board.

An object of the invention is to provide an indicator which may be readily applied to the instrument board of a motor vehicle, and which carries a roll of strip paper with a portion thereof exposed on which data may be inscribed.

Another object is to provide an indicator carrying a roll of strip paper arranged so that the end of the strip projects for receiving data and by which the strip may be pulled out for further use.

A further object is to provide an oil change indicator which is pleasing in appearance, which is economical to manufacture, and easily applied and effective for the purpose intended.

The above, other and further objects, will be apparent from the following disclosure and accompanying drawings and appended claims.

One form of the invention is illustrated in the accompanying drawings and the views thereof are as follows.

As shown in the drawings.

Figure 1:
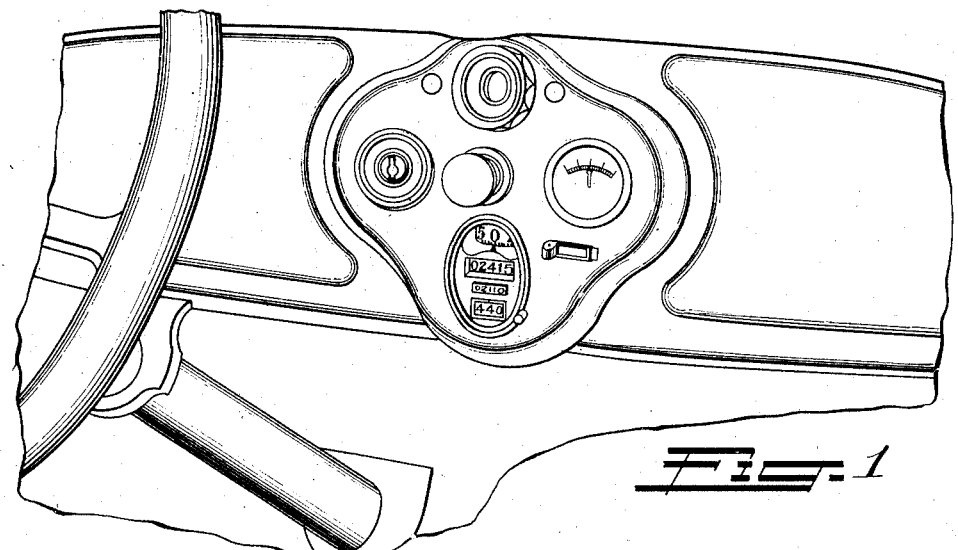
Figure 1 is a perspective fragmental view of an instrument board of an automobile, showing an embodiment of my invention applied to the same.
Figure 2:
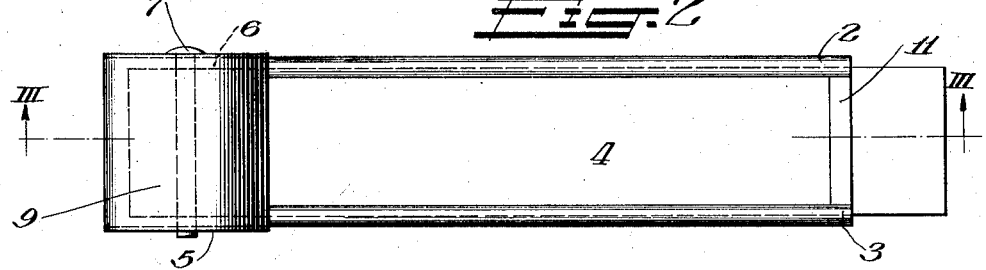
Figure 2 is an enlarged top plan view of the indicator.
Figure 3:
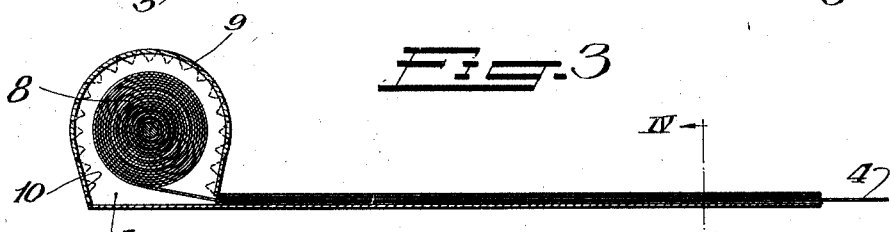
Figure 3 is a section taken on line III—III of Figure 2.
Figure 4:
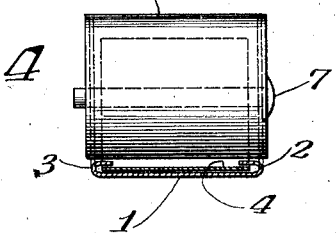
Figure 4 is a section taken on line IV—IV of Figure 3.

The invention has been illustrated in connection with the instrument board of an automobile but the invention is not limited to automobiles but is applicable to any kind of motor vehicle or similar vehicle requiring need for service data from time to time.

The invention as embodied in the accompanying drawings comprises an elongated plate 1 having the side edges inturned at 2 and 3 to form side guides for a strip 4 of paper or similar material.

Ears 5 and 6 are upturned from the plate 1 at one end thereof and are preferably integral with the plate. A pin 7 passes through apertures in these ears and supports a roll 8 of paper of which the portion 4 is a part.

A cap 9 of resilient metal is removably applied over the ears to protect the roll 8 and to afford a finish to the indicator. The cap 9 has elements cooperating with the ears to serve as guides when applying the same to the ears. Such guides are shown in the drawings as serrations 10 formed from the material from which the cap line is made and bent at right angles to the same to overlap the outer surfaces of the ears.

A transverse spacer or tear-off guide 11 is fastened to the under side of the inturned portion of the side guides 2 and 3, so that the strip 4 of the paper will pass underneath this guide. The guide serves as a tear-off edge when the used portion of the strip is to be removed and the strip pulled out to expose an unused portion for the reception of further data.

The indicator may be applied in any manner to any convenient portion of the instrument board. The end of the paper is pulled out so that the outer end is flush with the guide 11 and then any data may be inscribed on the portion exposed between the cover 9 and the guide 11, which in the event of automobiles consists of the mileage at which the engine oil shall be changed from the same at some future time. When the oil has been changed at such time, the strip is pulled out so that the data just used may be torn off and additional data as to the next future oil change my be suitably inscribed on the paper strip.

While I have described more or less precisely the details of construction of my invention yet I do not wish it to be understood as limiting myself thereto as I am aware that changes may be made in the arrangement and proportion of parts and that equivalents may be substituted all without departing from the spirit and scope of my invention.

I claim as my invention:

A memorandum device, comprising a base plate, a pair of upturned horse-shoe-shaped ears at one end of the plate, a roll of paper supported between the ears, a spring cap fitting over the ears to enclose the roll, the cap having an edge in spaced relation to the base plate to form a guide for paper withdrawn from the roll, and marginal projections on the cap engaging the ears to retain the cap in alined relation to the ears.

In testimony whereof I have hereunto subscribed my name at Evanston, Cook County, Illinois.

BENJAMIN GRIFFITHS.